US012789883B2

(12) United States Patent
Kim

(10) Patent No.: US 12,789,883 B2
(45) Date of Patent: Nov. 10, 2026

(54) STEER-BY-WIRE STEERING DEVICE

(71) Applicant: HL MANDO CORPORATION, Pyeongtaek-si (KR)

(72) Inventor: Taeho Kim, Suwon-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 439 days.

(21) Appl. No.: 18/382,380

(22) Filed: Oct. 20, 2023

(65) Prior Publication Data

US 2024/0294206 A1 Sep. 5, 2024

(30) Foreign Application Priority Data

Mar. 3, 2023 (KR) ........................ 10-2023-0028657

(51) Int. Cl.
*B62D 5/00* (2006.01)
*B62D 5/04* (2006.01)
*B62D 15/02* (2006.01)

(52) U.S. Cl.
CPC ........... *B62D 5/001* (2013.01); *B62D 5/0421* (2013.01); *B62D 15/025* (2013.01)

(58) Field of Classification Search
CPC .... B62D 5/001; B62D 5/0421; B62D 15/025; B62D 5/0403; B62D 5/0454; B62D 5/046; B60W 40/02; B60W 60/001; B60W 60/0053; B60W 2420/403; B60W 2420/408
See application file for complete search history.

(56) References Cited

U.S. PATENT DOCUMENTS 10,926,792 B2 * 2/2021 Rey .......................... B62D 5/04
2021/0261188 A1 * 8/2021 Ko .......................... B62D 3/08
2022/0097753 A1 * 3/2022 Markfort ................ B62D 5/006
2022/0297746 A1 * 9/2022 Washnock ........... B62D 5/0427
2023/0021499 A1 1/2023 Kwon et al.

FOREIGN PATENT DOCUMENTS

KR 10-2020-0034393 A 3/2020
KR 10-2023-0013941 A 1/2023

OTHER PUBLICATIONS

Office Action issued on Mar. 3, 2026, for corresponding Korean Patent Application No. 10-2023-0028657, with its English Machine translation, 16 pages.

* cited by examiner

*Primary Examiner* — Minnah L Seoh
*Assistant Examiner* — Al-Birr Rahman Chowdhury
(74) *Attorney, Agent, or Firm* — Hauptman Ham, LLP

(57) ABSTRACT

The present embodiments may provide a steer-by-wire steering device that may enhance the driver's driving feel and increase the driver's steering stability and convenience in manual driving mode and autonomous driving mode by stopping the steering wheel from further mechanical rotation when the wheel rotation reaches a maximum point.

20 Claims, 12 Drawing Sheets

STEER-BY-WIRE STEERING DEVICE

CROSS-REFERENCE TO RELATED APPLICATION

This application claims priority from Korean Patent Application No. 10-2023-0028657, filed on Mar. 3, 2023, which is hereby incorporated by reference for all purposes as if fully set forth herein.

BACKGROUND

Field

The present embodiments relate to a steer-by-wire steering device and, more specifically, to a steer-by-wire steering device that may stop the steering wheel from further mechanical rotation when the wheel rotation reaches a maximum point.

Description of Related Art

In general, vehicle steering devices adopt power steering for assisting the driver in manipulating the steering wheel and providing steering convenience. Power steering as developed and adopted includes hydraulic steering using hydraulic power, electro-hydraulic steering using both hydraulic power and motor power, and electric power steering using only motor power.

Recent steer-by-wire (SBW) steering devices do away with mechanical/physical linkages, such as universal joint or pinion shaft, between the steering wheel and the front wheels, using a motor instead to steer the vehicle.

However, such a steer-by-wire steering device lacks mechanical connection between the steering shaft and the wheels, which may lead to indefinite rotation of the driver's steering wheel, with the result of a poor steering feel and steering stability.

Further, in autonomous driving mode, the driver's safety may be threatened in an emergency, e.g., when the driver's body part is stuck to the steering wheel.

Therefore, a need arises for preventing deterioration of the driver's steering feel and safety even in an emergency, such as the driver's body part being stuck to the steering wheel, in autonomous driving mode, by stopping the steering wheel from further rotating when the wheel rotation reaches a maximum point.

BRIEF SUMMARY

Conceived in the foregoing background, the present embodiments may provide a steer-by-wire steering device that may enhance the driver's driving feel and increase the driver's steering stability and convenience in manual driving mode and autonomous driving mode by stopping the steering wheel from further mechanical rotation when the wheel rotation reaches a maximum point.

The objects of embodiments of the disclosure are not limited to the foregoing and other objects will be apparent to one of ordinary skill in the art from the following detailed description.

According to the present embodiments, there may be provided a steer-by-wire steering device comprising a connecting shaft coupled with a steering shaft, a rotating member rotating with the connecting shaft and having an inner protrusion and an outer protrusion, axially protruding on one side surface, radially spaced apart with an insertion space disposed between the inner protrusion and the outer protrusion, a guide member having a first end coupled to the outer protrusion and a second end coupled to the inner protrusion and disposed in the insertion space, a housing cover having the rotating member and the guide member embedded therein and having a guide groove radially elongated, and a supporting member having a first end supported in the guide groove and a second end supported on the guide member to radially move along the guide groove when the rotating member rotates.

According to the present embodiments, there may be provided a steer-by-wire steering device comprising a connecting shaft coupled with a steering shaft, a rotating member rotating with the connecting shaft and having an inner protrusion and an outer protrusion, axially protruding on one side surface, radially spaced apart with an insertion space disposed between the inner protrusion and the outer protrusion, the inner protrusion having an inner stepped portion on one side of an outer circumferential surface, and the outer protrusion having an outer stepped portion on one side of an inner circumferential surface, a guide member having a first end coupled to the outer protrusion and a second end coupled to the inner protrusion and disposed in the insertion space, a housing cover having the rotating member and the guide member embedded therein and having a guide groove radially elongated, a supporting member having a first end supported in the guide groove and a second end supported on the guide member to radially move along the guide groove when the rotating member rotates, the supporting member being supported on the inner stepped portion to stop rotation of the rotating member in one direction and being supported on the outer stepped portion to stop rotation of the rotating member in another direction, a driving member rotating the connecting shaft by electric power of a driving motor, and an electronic control unit controlling an operation of the driving motor according to an autonomous driving mode signal value or a manual driving mode signal value of a driving mode switch manipulated by a driver.

According to the present embodiments, in the steer-by-wire steering device, it is possible to enhance the driver's steering feel by stopping the steering wheel from further rotating when the wheel rotation reaches a maximum point.

Further, according to the present embodiments, it is possible to increase the driver's steering stability and convenience in manual driving mode and autonomous driving mode in the steer-by-wire steering device.

DESCRIPTION OF DRAWINGS

The above and other objects, features, and advantages of the disclosure will be more clearly understood from the following detailed description, taken in conjunction with the accompanying drawings, in which.

DETAILED DESCRIPTION

Figure 1:
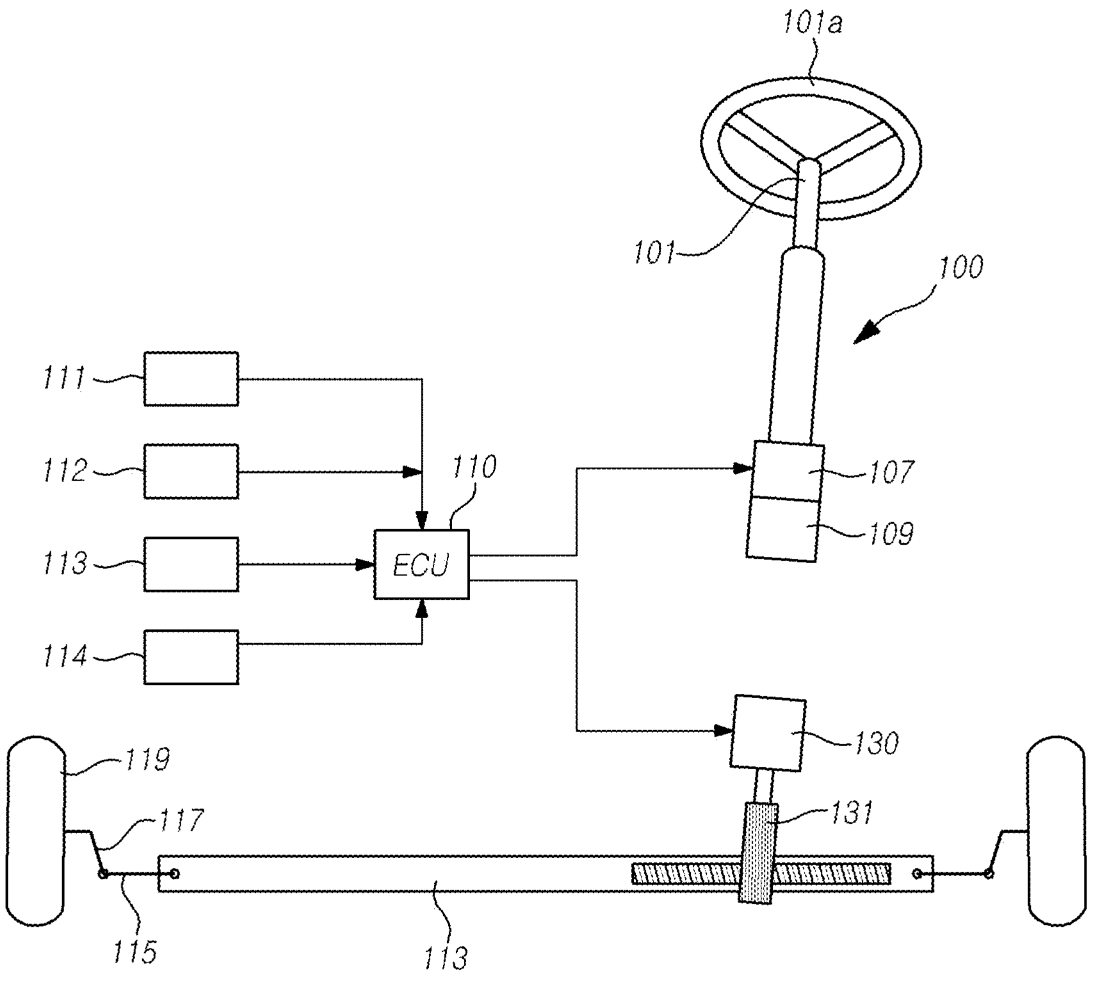
FIG. 1 is a view schematically illustrating a configuration of a steer-by-wire steering device according to the present embodiments.

In the following description of examples or embodiments of the disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the disclosure, detailed descriptions of well-known functions and components incorporated herein will be omitted when it is determined that the description may make the subject matter in some embodiments of the disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

Figure 2:
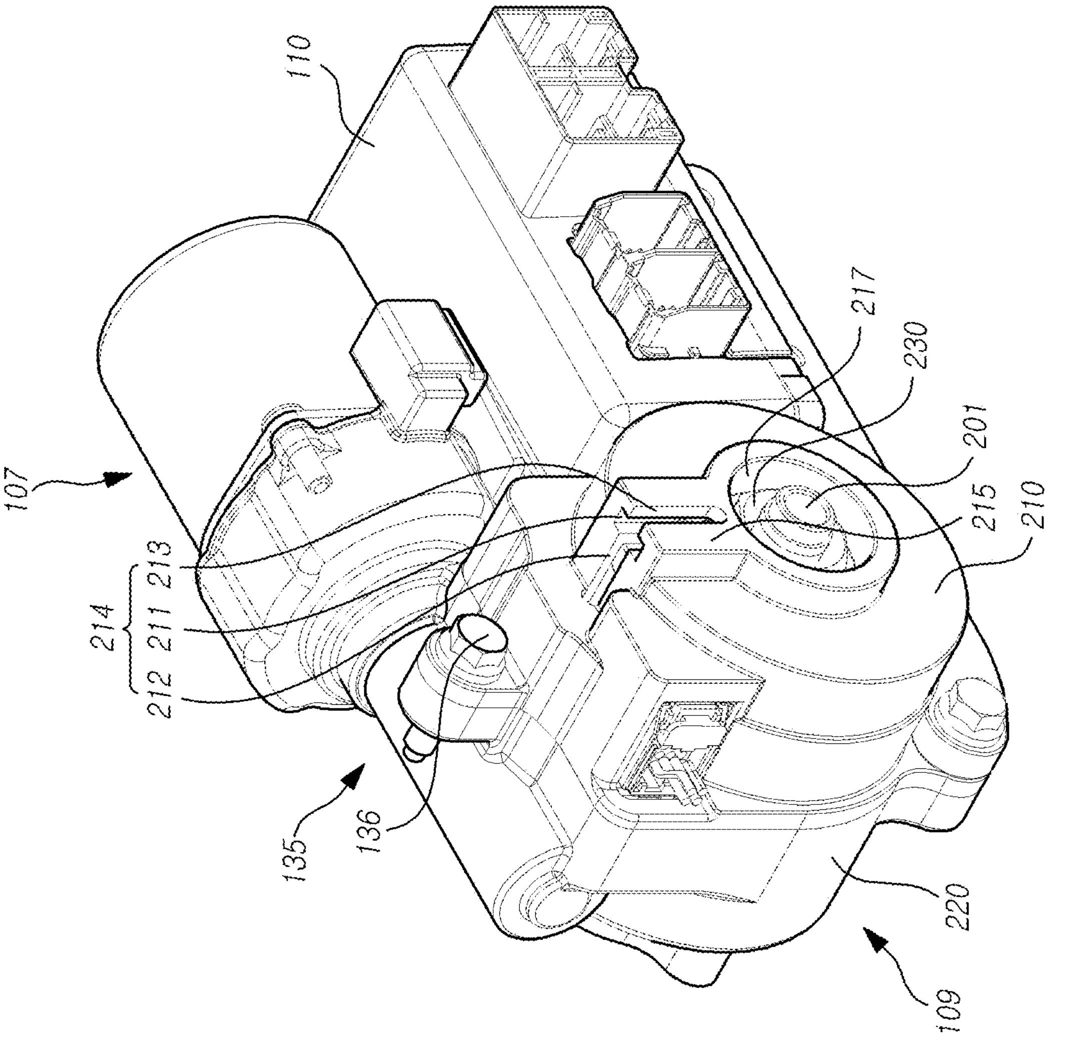
FIGS. 2 and 3 are perspective views illustrating a portion of a steer-by-wire steering device according to the present embodiments.
Figure 3:
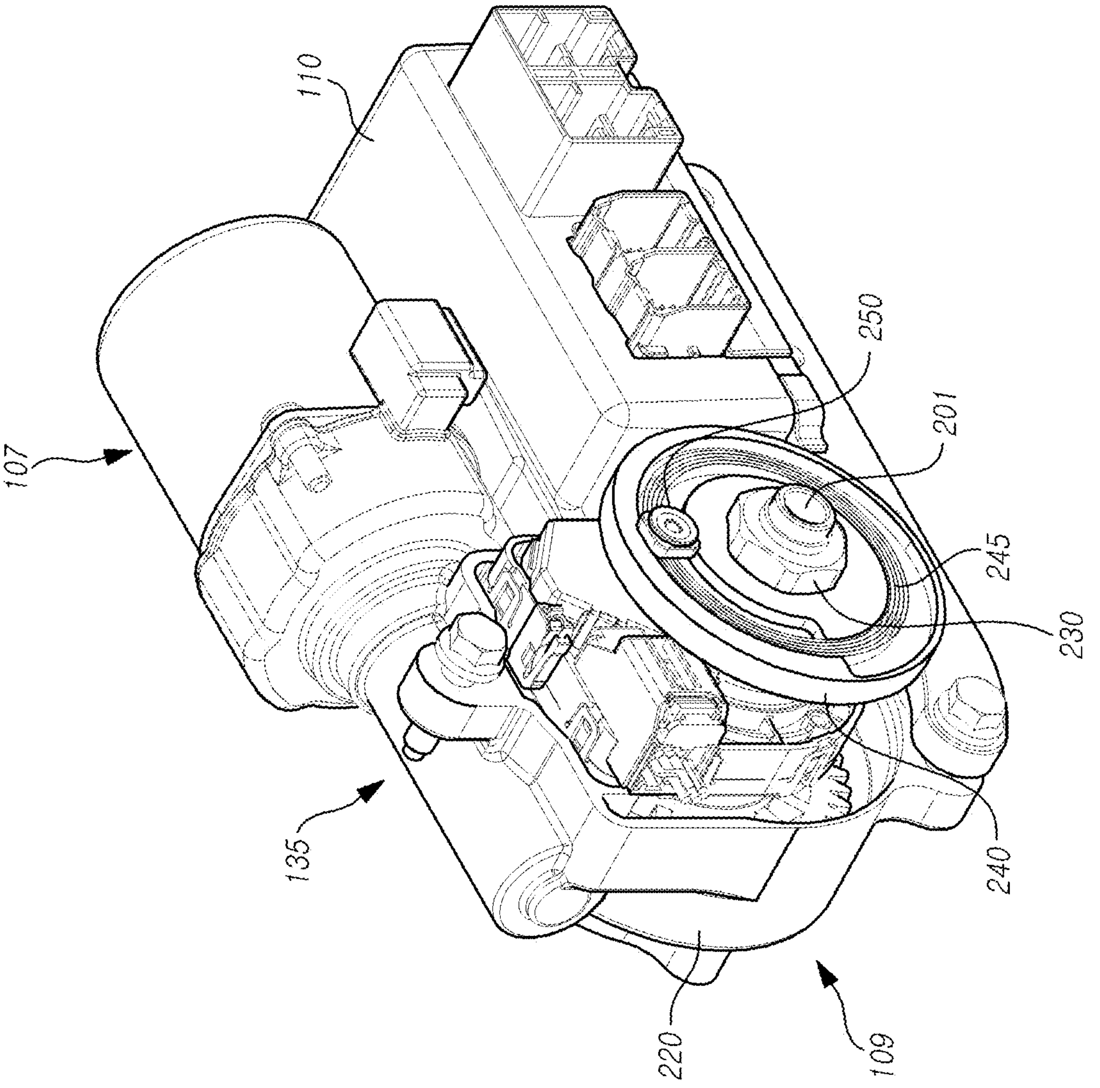
Figure 4:
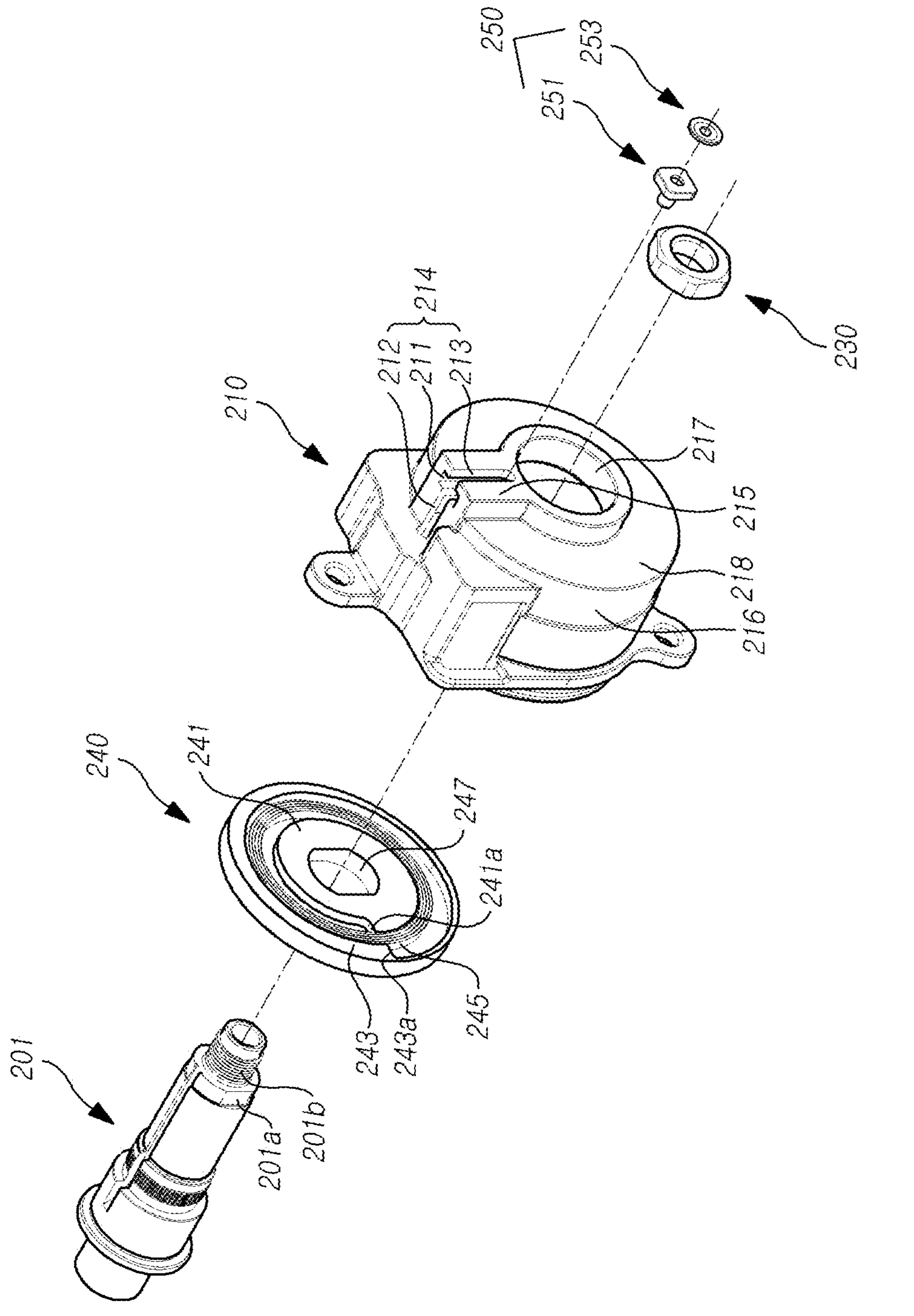
FIG. 4 is an exploded perspective view illustrating a portion of a steer-by-wire steering device according to the present embodiments.
Figure 5:
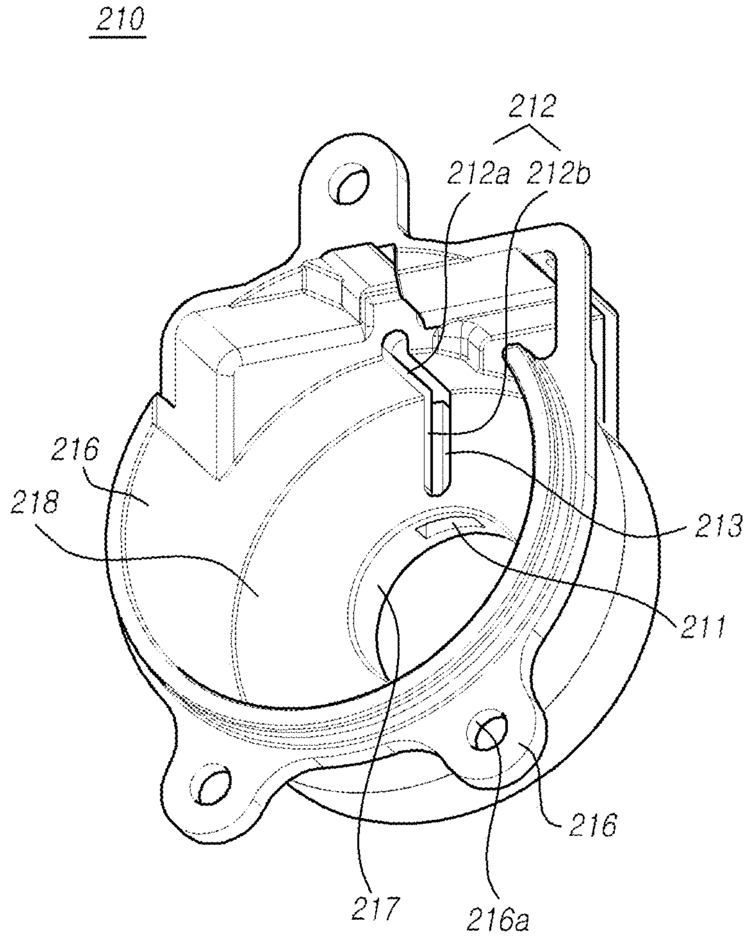
FIGS. 5 and 6 are perspective views illustrating a portion of a steer-by-wire steering device according to the present embodiments.
Figure 6:
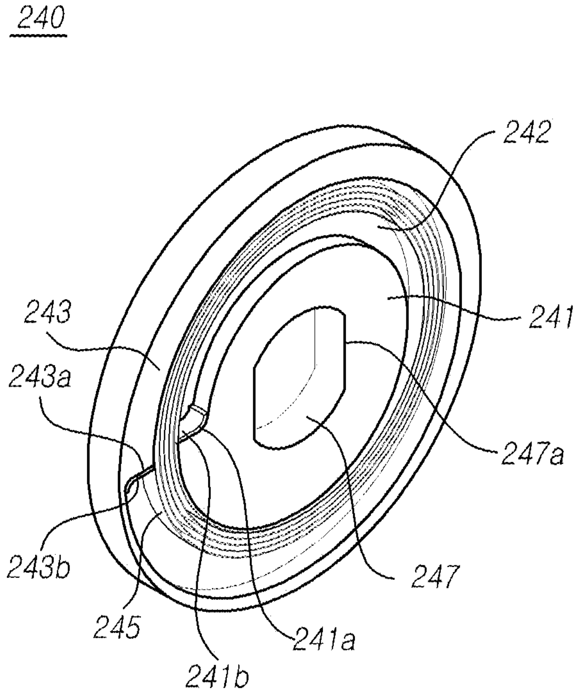
Figure 7:
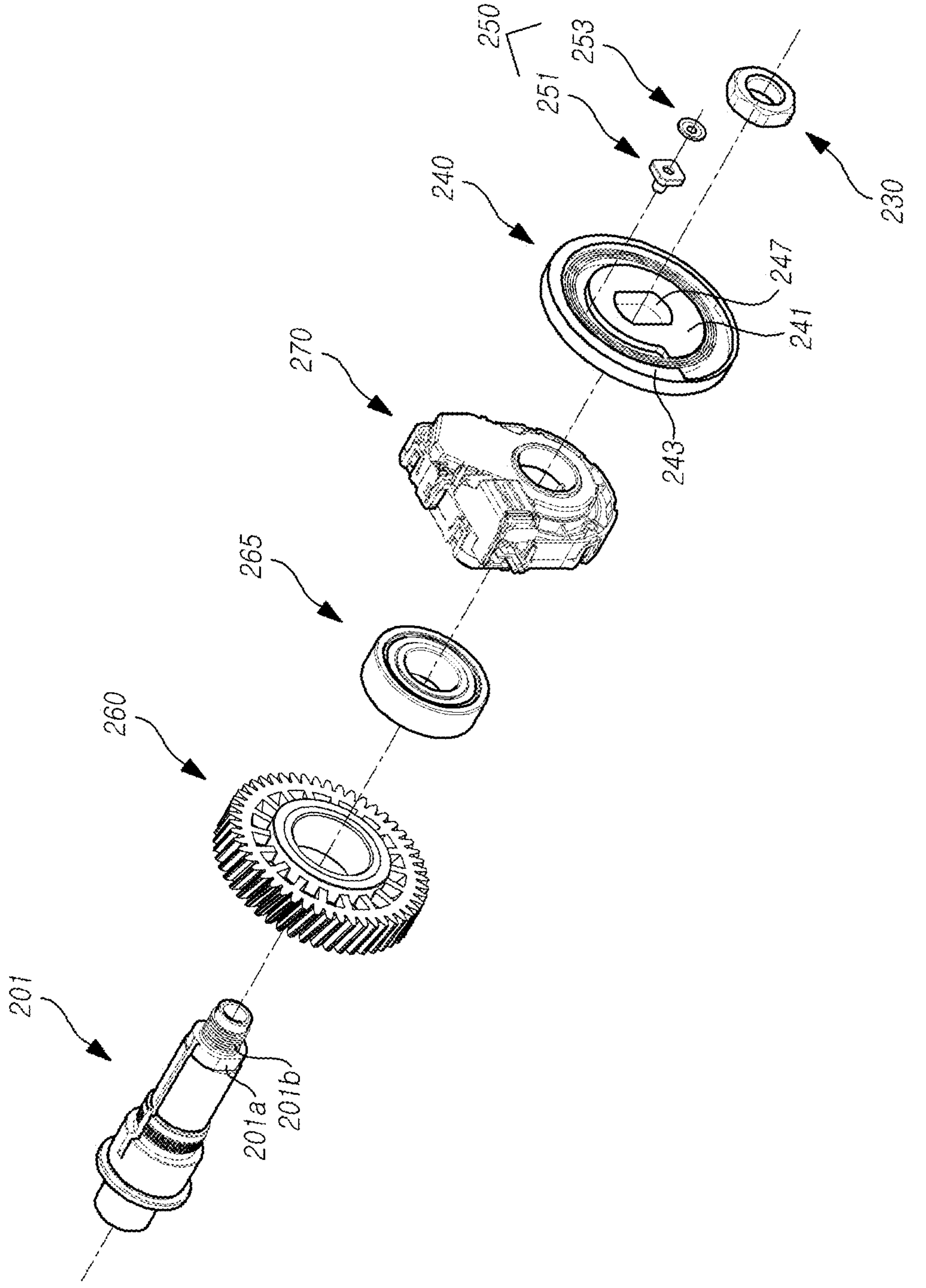
FIG. 7 is an exploded perspective view illustrating a portion of a steer-by-wire steering device according to the present embodiments.
Figure 8:
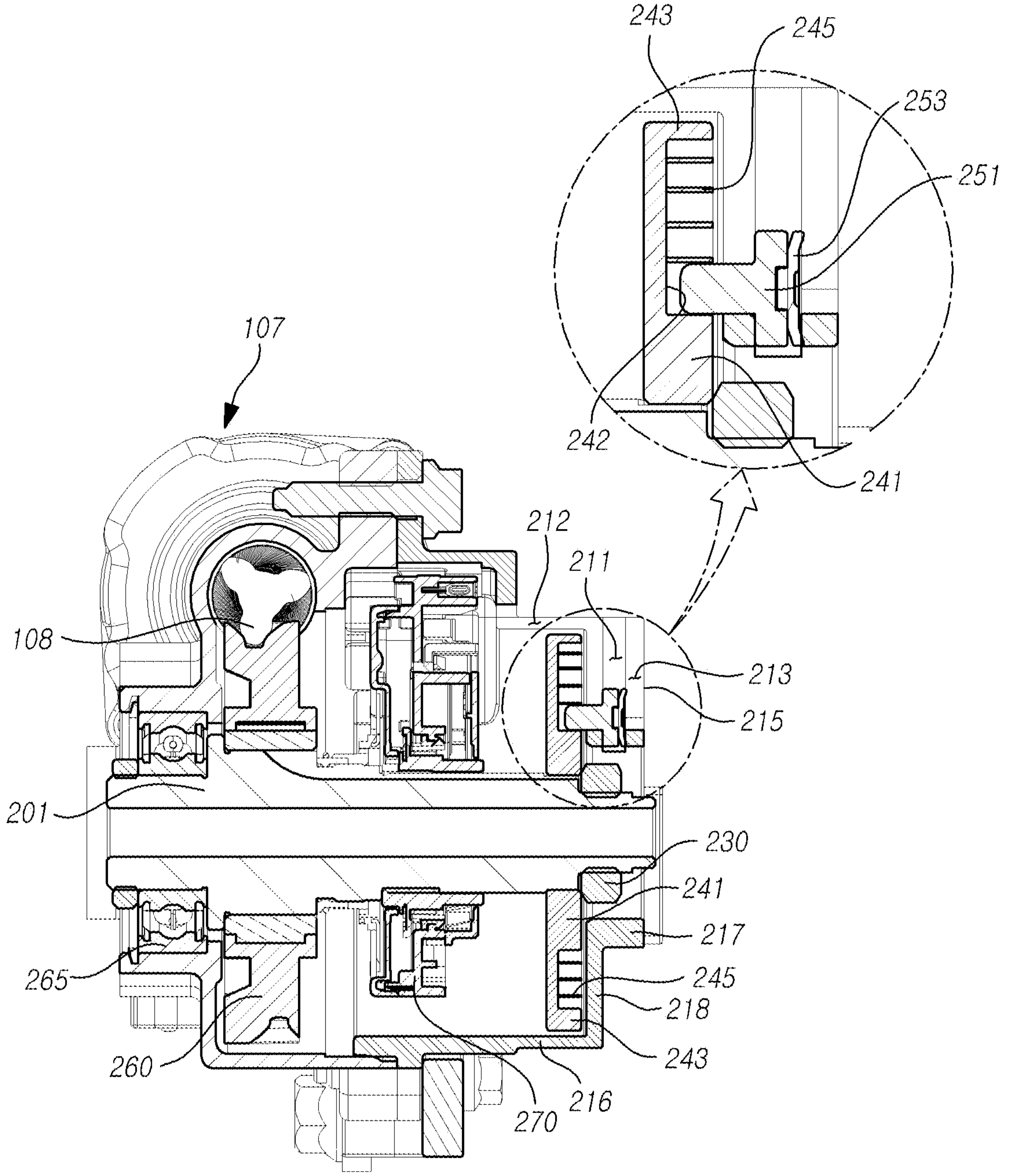
FIGS. 8 and 9 are cross-sectional views illustrating a portion of a steer-by-wire steering device according to the present embodiments.
Figure 9:
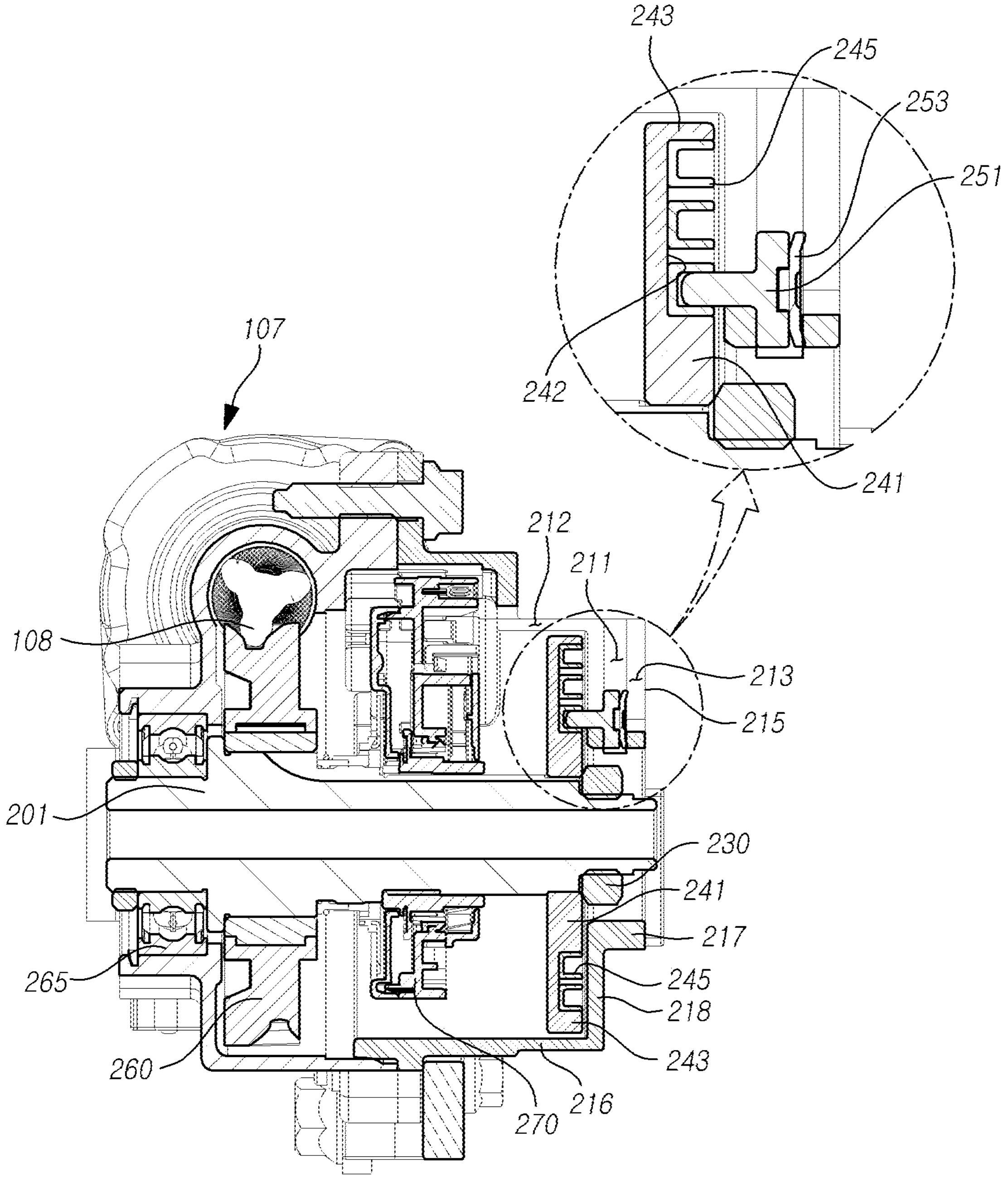
Figure 10:
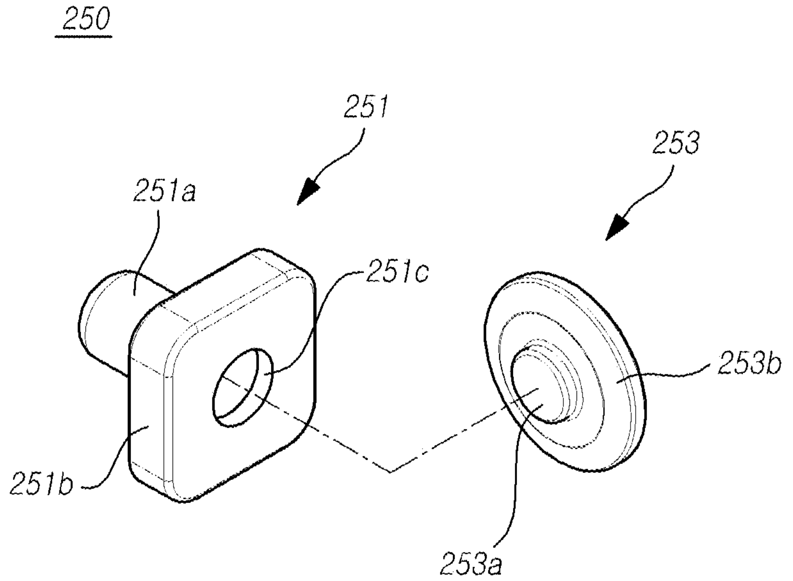
FIGS. 10 and 11 are exploded perspective views illustrating a portion of a steer-by-wire steering device according to the present embodiments.
Figure 11:
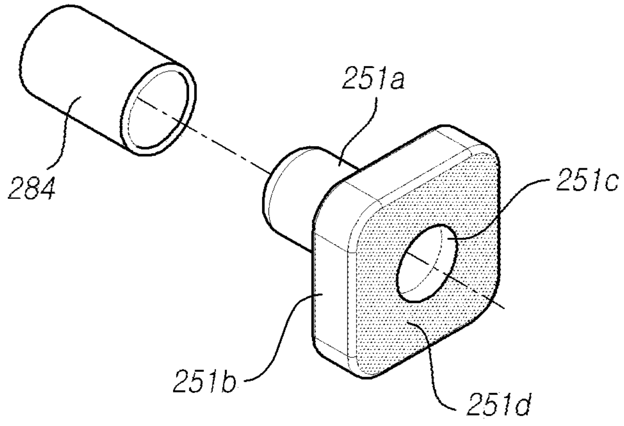
Figure 12:
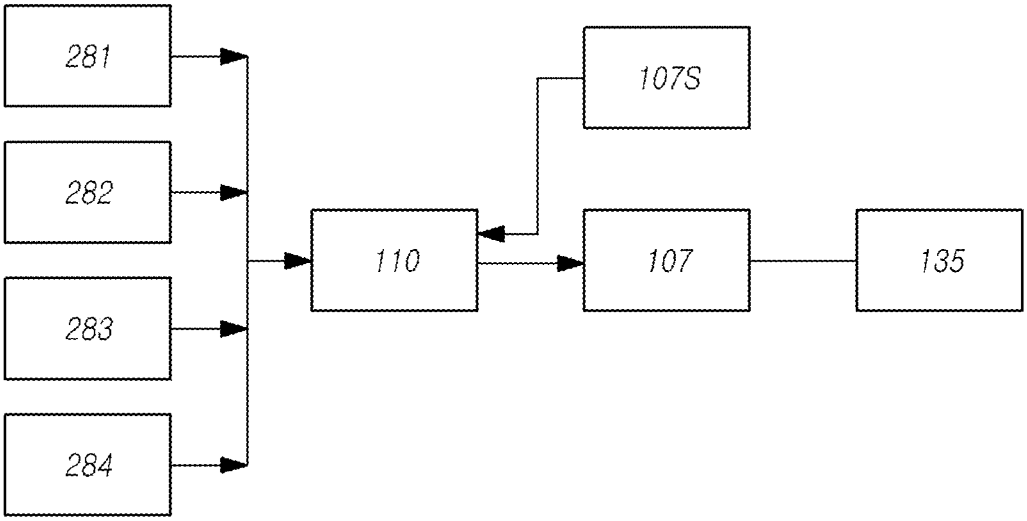
FIG. 12 is a view schematically illustrating a configuration of a steer-by-wire steering device according to the present embodiments.

FIG. 1 is a view schematically illustrating a configuration of a steer-by-wire steering device according to the present embodiments. FIGS. 2 and 3 are perspective views illustrating a portion of a steer-by-wire steering device according to the present embodiments. FIG. 4 is an exploded perspective view illustrating a portion of a steer-by-wire steering device according to the present embodiments. FIGS. 5 and 6 are perspective views illustrating a portion of a steer-by-wire steering device according to the present embodiments. FIG. 7 is an exploded perspective view illustrating a portion of a steer-by-wire steering device according to the present embodiments. FIGS. 8 and 9 are cross-sectional views illustrating a portion of a steer-by-wire steering device according to the present embodiments. FIGS. 10 and 11 are exploded perspective views illustrating a portion of a steer-by-wire steering device according to the present embodiments. FIG. 12 is a view schematically illustrating a configuration of a steer-by-wire steering device according to the present embodiments.

As shown in the drawings, a steer-by-wire steering device according to the present embodiments includes a connecting shaft 201 coupled with a steering shaft 101, a rotating member 240 rotating with the connecting shaft 201 and having an inner protrusion 241 and an outer protrusion 243, axially protruding on one side surface, radially spaced apart with an insertion space 242 disposed between the inner protrusion 241 and the outer protrusion 243, a guide member 245 having a first end coupled to the outer protrusion 243 and a second end coupled to the inner protrusion 241 and disposed in the insertion space 242, a housing cover 210 having the rotating member 240 and the guide member 245 embedded therein and having a guide groove 214 radially elongated, and a supporting member 251 having a first end supported in the guide groove and a second end supported on the guide member 245 to radially move along the guide groove when the rotating member 240 rotates.

First, in the steer-by-wire steering device according to the present embodiments, basically, an angle sensor 111 and a torque sensor 112, which sense the driver's manipulation of the steering wheel 101*a*, respectively transmit a steering angle and a torque value to the electronic control unit 110 to operate the driving motor 107 and the pinion shaft motor 130. The angle sensor 111 and the torque sensor 112 may be combined into a single component, e.g., a torque angle sensor 270.

The electronic control unit 110 controls the driving motor 107 and the pinion shaft motor 130 based on the electrical signals transmitted from the angle sensor 111 and the torque sensor 112 and data transmitted from various sensors mounted to the vehicle.

The driving motor 107 is connected to the driving member 135 that transfers the driving power to the steering shaft 101 and the connecting shaft 201. In the manual driving mode, the driving motor 107 provides a reaction force to the steering wheel 101*a* so that the driver may feel the steering reaction force in the opposite direction when manipulating the steering wheel 101*a*. In the autonomous driving mode, the vehicle is steered with the operation of the driving motor 107 under the control of the electronic control unit 110 without the driver's involvement.

The pinion shaft motor 130 may slide the rack bar 113 connected to the pinion shaft 113 to steer the wheels 119 on two opposite sides through the tie rods 115 and the knuckle arms 117.

However, in the present embodiments, for convenience of description, FIG. 1 illustrates an example in which there are provided the angle sensor 111, the torque sensor 112, and a vehicle velocity sensor 113 and a wheel rotational angle sensor 114 for transmitting steering information to the electronic control unit 110, and FIG. 12 illustrates an example in which there are provided a driving mode switch 283 manipulated by the driver, a first sensor 281 installed to the vehicle to obtain front image data of the vehicle, a second sensor 282 installed to the vehicle and selected from the group consisting of a radar and a lidar to obtain front sensing data of the vehicle, and a current sensor 107S.

Further, various sensors such as a motor position sensor may be provided, and a detailed description thereof is omitted.

In such a steer-by-wire steering device, since the steering wheel 101*a* and the wheel 119 are not mechanically connected to each other, a mechanical limitation is required to stop the rotation of the steering wheel 101*a* at a predetermined angle when the steering wheel 101*a* is operated by the driver.

In other words, the steering column 100 has a rotational angle limiting member 109 to mechanically limit the rotational angle of the steering wheel 101*a* to stop the steering wheel 101*a* from further rotation when the rotation of the wheel 119 reaches the maximum point (when the steering wheel 101*a* or the wheel 119 is in a full-turn state in the general steering device), providing an accurate sense of steering to the driver.

The rotational angle limiting member 109 may be coupled to the steering shaft 101 or the connecting shaft 201 coupled with the steering shaft 101*a* or may be directly coupled to the steering wheel 101*a* depending on the specifications of assembly with the vehicle and has the connecting shaft 201 coupled to the steering shaft 101, a rotating member 240 that is coupled to or integrally formed with the connecting shaft 201 to rotate with the connecting shaft 201, a housing cover 210 having a guide groove 214, and a supporting member 251 supported in the guide groove 214 and radially moving along the guide groove 214.

The rotational angle limiting member 109 is coupled to the steering column 100 so that the rotational angle of the steering wheel 101*a* is limited.

The housing cover 210 is coupled to the housing 220, which is coupled with the driving member 135 connected with the electronic control unit 110 and the driving motor 107, via a fastening member 136 and fixed to the steering column.

The rotation member 240 may be formed in a disk shape that rotates in conjunction with the connecting shaft 201 and may be coupled to or integrally formed with the connecting shaft 201.

The rotating member 240 has a coupling hole 247, to which the connecting shaft 201 is coupled, in the central portion thereof and has an inner protrusion 241 and an outer protrusion 243 axially protruding on one side surface and radially spaced apart from each other, with an insertion space 242 provided between the inner protrusion 241 and the outer protrusion 243.

One end of the guide member 245 is coupled to the outer protrusion 243, the other end of the guide member 245 is coupled to the inner protrusion 241, and the guide member 245 is disposed in the insertion space 242 of the rotating member 240.

The guide member 245 is formed of an elastic material and is disposed in a spiral spring shape spirally wound from one end to the other end of the guide member 245 inside the insertion space 242.

The guide member 245 is formed of an elastic material, and may be formed of a metal material or a plastic material among elastic materials.

Further, as illustrated in FIG. 9, the guide member 245 may be formed in a tube shape that is opened from one end to the other end in a direction in which the supporting member 251 is coupled, i.e., a direction facing the supporting member 251, and may be disposed in a spiral spring shape that is spirally wound from one end to the other end of the guide member 245 in the insertion space 242.

At least one flat portion 201*a* may be formed on the outer circumferential surface of the connecting shaft 201, and a coupling portion 247*a* having a shape corresponding to the flat portion 201*a* of the connecting shaft 201 may be provided on the inner circumferential surface of the coupling hole 247 of the rotating member 240.

The flat portion 201*a* and the coupling portion 247*a* are not limited to the flat shape illustrated in the drawings as long as the flat portion 201*a* and the coupling portion 247*a* are in tight contact with each other and are coupled to each other to prevent the connecting shaft 201 and the rotating member 240 from slipping.

Further, the connecting shaft 201 has a screw portion 201*b* formed on the outer circumferential surface of an end portion thereof, and is fixed to the rotating member 240 by the fastening member 230 coupled thereto, and is rotatably coupled to the inner circumferential surface of the housing 220 by the bearing 265.

The inner protrusion 241 has an inner stepped portion 241*a* that is radially spaced apart from the coupling hole 247 provided in the center of the rotating member 240, is formed to have a radius circumferentially increasing, and has an outer circumferential surface radially connected to one side of the outer circumferential surface.

Accordingly, the supporting member 251 is supported on the inner stepped portion 241*a* when the rotating member 240 rotates, stopping rotation of the rotating member 240 in one direction.

The outer protrusion 243 has an outer stepped portion 243*a* that is radially spaced apart from the outer circumferential surface of the rotating member 240, is formed to have a radius circumferentially decreasing, and has an inner circumferential surface radially connected to one side of the inner circumferential surface.

Accordingly, the supporting member 251 is supported on the outer stepped portion 243*a* when the rotating member 240 rotates, stopping rotation of the rotating member 240 in the other direction.

Further, as shown in FIG. 6, the inner stepped portion 241*a* may have an inner damper 241*b* where the supporting member 251 is supported, and the outer stepped portion 243*a* may have an outer damper 243*b* where the supporting member 251 is supported.

Accordingly, the supporting end portion 251*a* of the supporting member 251 is supported by the inner damper 241*b* and the outer damper 243*b* when rotation of the rotating member in the one direction and the other direction is limited, absorbing impact and preventing noise.

The inner damper 241*b* and the outer damper 243*b* may be formed of at least one of elastic materials, such as natural rubber (NR), butadiene rubber (BR), nitrile butadiene rubber (NBR), chloroprene rubber (CR), ethylene propylene diene monomer (EPDM) rubber), styrene butadiene rubber (SBR), chlorosulfonated polyethylene (CSM), fluoride rubber, silicone, urethane, and thermoplastic polyurethane (TPU), which are easily elastically compressed to be able to absorb impact and noise.

Further, the inner damper 241*b* and the outer damper 243*b* may be formed of at least one of plastic materials such as polyacetal (POM), polyamide (PA), polycarbonate (PC), polyimide (PI), polybutylene terephthalate (PBT), polyethylene terephthalate (PET), or the like.

The housing cover 210 has a cylinder portion 216 formed in the axial direction of the connecting shaft 201 and a housing cover barrier rib 218 facing one side surface of the rotating member 240, and the housing cover barrier rib 218 has a through hole 217 through which the connecting shaft 201 passes.

Further, the housing cover barrier rib 218 has a guide groove 214 formed in the radial direction, one end of the supporting member 251 is supported by the guide groove 214, and the other end of the supporting member 251 is supported by the guide member 245, so that when the rotating member 240 rotates, the supporting member 251 radially moves along the guide groove 214.

Further, the housing cover barrier rib 218 may have a protruding barrier rib 215 protruding in the axial direction and connected to the cylinder portion 216, and a guide groove 214 may be provided in the protruding barrier rib 215.

Here, the guide groove 214 may include a first guide groove 211 disposed between the inner surface and the outer surface of the protruding barrier rib 215, opened outward in the radial direction of the protruding barrier rib 215, and formed to communicate with the through hole 217, and a second guide groove 212 communicating with the first guide groove 211 and connected to the inner surface of the protruding barrier rib 215 through the cylinder portion 216.

The first guide groove 211 is disposed between the inner surface and the outer surface of the protruding barrier rib 215 and is formed to be elongated in the circumferential direction of the protruding barrier rib 215, and an upper side of the first guide groove 211 is formed to have an open outer side in the radial direction, and a lower side thereof is formed to be opened and communicate with the through hole 217.

The second guide groove 212 is formed to pass through the inner surface of the housing cover barrier rib 218, and the upper cylinder portion 216 is also formed to be axially opened so that as shown in FIG. 5, the second guide groove 212*a* formed in the cylinder portion 216 is vertically connected to the second guide groove 212*b* formed in the housing cover barrier rib 218.

The supporting member 251 has a supporting end portion 251*a* passing through the second guide groove 212 and supported on the guide member 245 and an insertion end portion 251*b* radially extending from the supporting end portion 251*a* and inserted and supported in the first guide groove 211.

Accordingly, if the rotating member 240 rotates in conjunction with the connecting shaft 201, the supporting end portion 251*a* is supported on the guide member 245, generating a force of spirally rotating. Simultaneously, the insertion end portion 251*b* is supported in the first guide groove 211 and its rotation is limited, so that the supporting member 251 is radially moved.

Upon assembly of the supporting member 251, the supporting end portion 251*a* is inserted into the second guide groove 212 formed to be opened in the cylinder portion 216, and the insertion end portion 251*b* is simultaneously inserted into the first guide groove 211, so that they are radially assembled.

Further, the guide groove 214 may include a third guide groove 213 that communicates with the first guide groove 211 and is formed to be opened outward in the axial direction of the protruding barrier rib 215.

As the third guide groove 213 is formed to have an open outer side in the axial direction of the protruding rib 215 to allow the insertion end portion 251*b* to be viewed from outside and is formed to communicate with the first guide groove 211, it is possible to perform assembly while identifying whether the supporting member 251 and the guide member 245 are in position.

Meanwhile, as shown in FIGS. 8 to 10, an elastic supporting member 253 may be coupled between the inner surface of the protruding barrier rib 215 and the insertion end portion 251*b* of the supporting member 251.

The elastic supporting member 253 is coupled while being elastically compressed between the insertion end portion 251*b* and the protruding barrier rib 215 to thereby support the supporting member 251 toward the guide member 245, preventing noise due to the gap between the supporting member 251 and the housing cover 210.

A fixing recess 251*c* is formed in the outer circumferential surface of the insertion end portion 251*b*, and a fixing protrusion 253*a* coupled to the fixing recess 251*c* of the insertion end portion 251*b* is formed on the inner surface of the elastic supporting member 253, allowing them to be assembled into a single body.

The supporting member 251 and the elastic supporting member 253, together as a supporting member assembly 250, may be coupled to the guide groove 214 or, as shown in FIG. 11, a coating portion 251*d* obtained by coating the outer surface of the insertion end portion 251*b* of the supporting member 251 with a low-friction elastic material may be formed to couple only the supporting member 251 to the guide groove 214.

The coating portion 251*d* formed of a low-friction material may be provided on the outer surface and inner surface of the insertion end portion 251*b*. When only the supporting member 251 is coupled to the guide groove 214, the coating portion 251*d* may be moved in contact with the inner surface of the protruding barrier rib 215 and the outer surface of the housing cover barrier rib 218, reducing frictional load when the supporting member 251 moves.

Referring to FIG. 12 together with FIGS. 1 to 11, a steer-by-wire steering device according to the present embodiments may include a connecting shaft 201 coupled with a steering shaft 101, a rotating member 240 rotating with the connecting shaft 201 and having an inner protrusion 241 and an outer protrusion 243, axially protruding on one side surface, radially spaced apart with an insertion space 242 disposed between the inner protrusion 241 and the outer protrusion 243, the inner protrusion 241 having an inner stepped portion 241*a* on one side of an outer circumferential surface, and the outer protrusion 243 having an outer stepped portion 243*a* on one side of an inner circumferential surface, a guide member 245 having a first end coupled to the outer protrusion 243 and a second end coupled to the inner protrusion 241 and disposed in the insertion space 242, a housing cover 210 having the rotating member 240 and the guide member 245 embedded therein and having a guide groove 214 radially elongated, a supporting member 251 having a first end supported in the guide groove 214 and a second end supported on the guide member 245 to radially move along the guide groove 214 when the rotating member 240 rotates, the supporting member 251 being supported on the inner stepped portion 241*a* to stop rotation of the rotating member 240 in one direction and being supported on the outer stepped portion 243*a* to stop rotation of the rotating member 240 in another direction, a driving member 135 rotating the connecting shaft 201 by electric power of a driving motor 107, and an electronic control unit 110 controlling an operation of the driving motor 107 according to an autonomous driving mode signal value or a manual driving mode signal value of a driving mode switch 283 manipulated by a driver.

Here, since the connecting shaft 201, the rotating member 240, the guide member 245, the housing cover 210, and the supporting member 251 are the same as those described above, a detailed description thereof is omitted.

The driving member 135 includes a worm shaft 108 coupled with the driving motor 107 to rotate and a worm wheel 260 coupled to an outer circumferential surface of the connecting shaft 201 and engaged with the worm shaft 108 to rotate the connecting shaft 201 with driving power of the driving motor 107.

The driving member 135, together with the electronic control unit 110 and the driving motor 107, are embedded in the housing 220 to rotate the connecting shaft 201 with the driving power of the driving motor 107.

Further, the present embodiments may further include a first sensor 281 installed to the vehicle to obtain front image data of the vehicle and a second sensor 282 installed to the vehicle and selected from the group consisting of a radar and a lidar to obtain front sensing data of the vehicle.

Here, as the first sensor 281, various cameras installed on the front, rear, or side of the vehicle may be used, and the first sensor 281 obtains front image data required for autonomous driving of the vehicle and transmits the data to the electronic control unit 110.

The second sensor 282 may be constituted of a radar or a lidar, obtains, e.g., the relative position and relative velocity of an object (another vehicle, a pedestrian, or a structure) around the vehicle and transmits front sensing data required for autonomous driving of the vehicle to the electronic control unit 110.

If receiving the manual driving mode signal value from the driving mode switch 283, the electronic control unit 110 operates the driving motor 107 in the direction opposite to the rotating direction of the connecting shaft 201 to provide the driver with a sense of steering reaction force through the steering wheel 101*a* coupled to the connecting shaft 201 and the steering shaft 101.

Further, if receiving the autonomous driving mode signal value from the driving mode switch 283, the electronic control unit 110 operates the driving motor 107 according to the image data received from the first sensor 281 and the front sensing data received from the second sensor 282, allowing for steering according to the autonomous driving mode.

Further, the present embodiments may further include a current sensor 107S for sensing the amount of current of the driving motor 107 and a contact sensor 284 coupled to an outer circumferential side of the supporting member 251 to sense a contact to the inner stepped portion 241*a* and the outer stepped portion 243*a* when the rotating member 240 rotates.

If the current value received from the current sensor 107S is larger than preset data in a state in which the autonomous driving mode signal value is received from the driving mode switch 283, and a non-contact signal value is received from the contact sensor 284, the electronic control unit 110 determines an emergency and switches the operation of the driving motor 107 into the manual driving mode.

In this case, the electronic control unit 110 determines an emergency in which the driver's body part is stuck to the steering wheel while the autonomous driving mode is running to cause excessive torque in the driving motor 107 and switches the operation of the driving motor 107 into the manual driving mode.

Accordingly, even in an emergency where the driver's body part is stuck to the steering wheel 101*a* in the autonomous driving mode, it is possible to prevent the driving power of the driving motor 107 from being delivered to the driver through the steering wheel 101*a* while enabling the driver to manipulate the steering wheel 101*a*, allowing the driver to take a quick step for safety.

As described above, according to the present embodiments, in the steer-by-wire steering device, it is possible to enhance the driver's steering feel by stopping the steering wheel from further rotating when the wheel rotation reaches a maximum point.

Further, according to the present embodiments, it is possible to increase the driver's steering stability and convenience in manual driving mode and autonomous driving mode in the steer-by-wire steering device.

The above description has been presented to enable any person skilled in the art to make and use the technical idea of the disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the disclosure. The above description and the accompanying drawings provide an example of the technical idea of the disclosure for illustrative purposes only. That is, the disclosed embodiments are intended to illustrate the scope of the technical idea of the disclosure. Thus, the scope of the disclosure is not limited to the embodiments shown, but is to be accorded the widest scope consistent with the claims. The scope of protection of the disclosure should be construed based on the following claims, and all technical ideas within the scope of equivalents thereof should be construed as being included within the scope of the disclosure.

What is claimed:

1. A steer-by-wire steering device, comprising:

a connecting shaft coupled with a steering shaft;

a rotating member configured to rotate with the connecting shaft and having an inner protrusion and an outer protrusion, axially protruding on one side surface, radially spaced apart with an insertion space disposed between the inner protrusion and the outer protrusion;

a guide member having a first end coupled to the outer protrusion and a second end coupled to the inner protrusion and disposed in the insertion space;

a housing cover having the rotating member and the guide member embedded therein and having a guide groove radially elongated; and a supporting member having a first end supported in the guide groove and a second end supported on the guide member to radially move along the guide groove when the rotating member rotates, wherein a coupling hole to which the connecting shaft is coupled is formed at a central portion of the rotating member such that the rotating member rotates by a same rotation angle as the steering shaft, and wherein the guide member is arranged in the insertion space in a spiral spring shape stacked in a radial direction about the coupling hole.

2. The steer-by-wire steering device of claim 1, wherein the guide member is spirally wound from the first end to the second end and is disposed in the insertion space.

3. The steer-by-wire steering device of claim 2, wherein the guide member is formed of an elastic material.

4. The steer-by-wire steering device of claim 2, wherein the guide member is formed of a metal material.

5. The steer-by-wire steering device of claim 2, wherein the guide member is formed of a plastic material.

6. The steer-by-wire steering device of claim 2, wherein the guide member has a tube shape opened toward the supporting member.

7. The steer-by-wire steering device of claim 1, wherein the inner protrusion is formed to be radially spaced apart from a center of the rotating member and have a circumferentially increasing radius and has an inner stepped portion radially connected to an outer circumferential surface of one side, and wherein rotation of the rotating member in one direction is stopped as the supporting member is supported on the inner stepped portion.

8. The steer-by-wire steering device of claim 7, wherein the outer protrusion is formed to be radially spaced apart from an outer circumferential surface of the rotating member and have a circumferentially decreasing radius and has an outer stepped portion radially connected to an inner circumferential surface of one side, and wherein rotation of the rotating member in another direction is stopped as the supporting member is supported on the outer stepped portion.

9. The steer-by-wire steering device of claim 7, wherein the inner stepped portion has an inner damper where the supporting member is supported.

10. The steer-by-wire steering device of claim 8, wherein the outer stepped portion has an outer damper where the supporting member is supported.

11. The steer-by-wire steering device of claim 1, wherein the housing cover has a cylinder portion formed in an axial direction of the connecting shaft and a housing cover barrier rib facing one side surface of the rotating member, and wherein the housing cover barrier rib has a through hole through which the connecting shaft passes.

12. The steer-by-wire steering device of claim 11, wherein the housing cover barrier rib has a protruding barrier rib axially protruding and connected with the cylinder portion, and wherein the guide groove includes a first guide groove disposed between an inner surface and outer surface of the protruding barrier rib, opened outward in a radial direction of the protruding barrier rib, and formed to communicate with the through hole and a second guide groove communicating with the first guide groove and connected to the inner surface of the protruding barrier rib through the cylinder portion.

13. The steer-by-wire steering device of claim 12, wherein the supporting member has a supporting end portion passing through the second guide groove and supported on the guide member and an insertion end portion radially extending from the supporting end portion and inserted and supported in the first guide groove.

14. The steer-by-wire steering device of claim 12, wherein the guide groove includes a third guide groove communicating with the first guide groove and formed to be opened outward in an axial direction of the protruding barrier rib.

15. The steer-by-wire steering device of claim 13, wherein the supporting member has a coating portion formed of a low-friction material on an outer surface and inner surface of the insertion end portion and supported on an inner surface of the first guide groove.

16. A steer-by-wire steering device, comprising:

a connecting shaft coupled with a steering shaft;

a rotating member rotating with the connecting shaft and having an inner protrusion and an outer protrusion, axially protruding on one side surface, radially spaced apart with an insertion space disposed between the inner protrusion and the outer protrusion, the inner protrusion having an inner stepped portion on one side of an outer circumferential surface, and the outer protrusion having an outer stepped portion on one side of an inner circumferential surface;

a guide member having a first end coupled to the outer protrusion and a second end coupled to the inner protrusion and disposed in the insertion space;

a housing cover having the rotating member and the guide member embedded therein and having a guide groove radially elongated;

a supporting member having a first end supported in the guide groove and a second end supported on the guide member to radially move along the guide groove when the rotating member rotates, the supporting member being supported on the inner stepped portion to stop rotation of the rotating member in one direction and being supported on the outer stepped portion to stop rotation of the rotating member in another direction;

a driving member configured to rotate the connecting shaft by electric power of a driving motor; and an electronic control unit configured to control an operation of the driving motor according to an autonomous driving mode signal value or a manual driving mode signal value of a driving mode switch manipulated by a driver, wherein a coupling hole to which the connecting shaft is coupled is formed at a central portion of the rotating member such that the rotating member rotates by a same rotation angle as the steering shaft, and wherein the guide member is arranged in the insertion space in a spiral spring shape stacked in a radial direction about the coupling hole.

17. The steer-by-wire steering device of claim 16, wherein the driving member includes:

a worm shaft coupled with the driving motor and rotating; and a worm wheel coupled to an outer circumferential surface of the connecting shaft and engaged with the worm shaft to rotate the connecting shaft by driving power of the driving motor.

18. The steer-by-wire steering device of claim 17, further comprising:

a first sensor installed to a vehicle to obtain front image data of the vehicle;

a second sensor installed to the vehicle and selected from the group consisting of a radar and a lidar to obtain front sensing data of the vehicle, wherein the electronic control unit is configured to operate the driving motor in a direction opposite to a rotating direction of the connecting shaft to provide a sense of steering reaction force to the driver if the manual driving mode signal is received and wherein, if the autonomous driving mode signal value is received, the electronic control unit is configured to operate the driving motor according to the image data received from the first sensor and the front sensing data received from the second sensor.

19. The steer-by-wire steering device of claim 18, further comprising:

a current sensor configured to sense a current amount of the driving motor; and a contact sensor coupled to an outer circumferential side of the supporting member and configured to sense a contact to the inner stepped portion and the outer stepped portion when the rotating member rotates.

20. The steer-by-wire steering device of claim 19, wherein if a current value received from the current sensor is larger than preset data in a state in which the autonomous driving mode signal value is received, and a non-contact signal value is received from the contact sensor, the electronic control unit is configured to determine an emergency and switches the operation of the driving motor to the manual driving mode.

* * * * *